Patented June 25, 1940

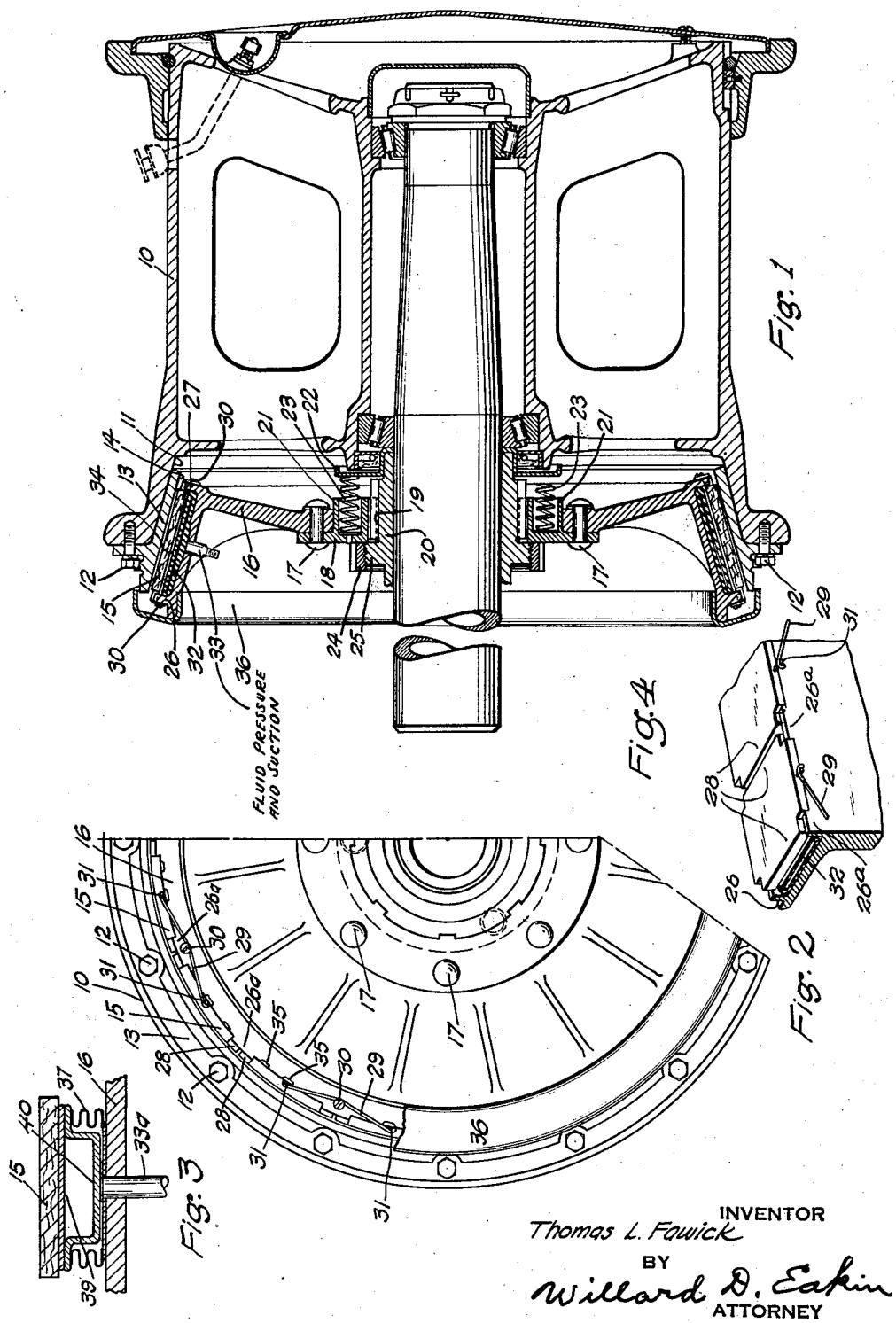

2,205,521

UNITED STATES PATENT OFFICE 2,205,521

ASSEMBLY FOR BRAKES AND THE LIKE

Thomas L. Fawick, Akron, Ohio, assignor to The Fawick Company, Inc., Wabash, Ind., a corporation of Indiana Application May 13, 1938, Serial No. 207,741

18 Claims. (Cl. 188—152)

This invention relates to assemblies suitable for brakes such as are employed in automobiles and aircraft, for example, and for analogous uses, as in clutches, for example.

Its chief objects are strong effectivness; ease and quickness of application and release; economy of manufacture; dependability; durability; lightness; ventilation and self-cleaning.

More specific objects are ease and accuracy of adjustment, as for compensating for wear; avoidance of binding or breakage caused by heat-expansion of an actuating fluid in a fluid-actuated brake, such as sometimes occurs when the vehicle stands or travels with the brake at a fixed setting and the frictional heat of the braking action reaches the actuating fluid; economy of space for a brake in a wheel assembly of small rim diameter; simple and effective exclusion of dirt and moisture; and effective cooling.

Of the accompanying drawing:

Fig. 1 is an axial section of a brake assembly embodying my invention in its preferred form.

Fig. 2 is an elevation of the same, with a part broken away, as viewed from the left of Fig. 1.

Fig. 3 is a fragmentary sectional view illustrating a modification.

Fig. 4 is a fragmentary perspective view of two adjacent friction blocks and a part of their mounting, showing the same relationship as in Figs. 1 and 2.

In the embodiment illustrated in Figs. 1 and 2 the hub 10 of a vehicle wheel is formed at its inner end with a conical inner marginal face 11 against which is held by bolts 12, 12 an annular brake member 13 having a conical inner braking face 14.

For frictional coaction with the face 14 a circumferential series of arcuate brake shoes or blocks 15, 15 of frictional and heat resisting and insulating material are mounted upon a stationary annular member 16, of L-shape in cross-section and preferably of a light metal, which is secured by rivets 17, 17 to a stationary hub member 18 which at 19 is splined upon the axle-housing 20 of the vehicle.

Interposed between spring seats 21, 21, formed on the stationary hub member 18, and an annular stamping 22 press-fitted on the end of the axle-housing, are compression springs 23, 23 constantly holding the hub member 18 against an adjustment nut 24 threaded upon a flange 25 formed on the axle-housing.

The outer portion of the member 16 is of generally conical form and has in its outer face a channel defined by marginal annular flanges 26, 27 with circumferentially spaced, outwardly projecting lug portions such as those shown at 26ª, 26ª in Fig. 2, these lugs slidably fitting in rectangular notches 28, 28 formed in the corners of the frictional blocks 15, to interlock the blocks against relative rotation while permitting them to be moved outwardly to effect the braking action and inwardly to release the brake.

For constantly urging the blocks inwardly toward their non-braking positions springs, such as the springs 29, 29 (Fig. 2), are mounted on the outer faces of the flanges 26, 27 by means of screws 30, 30 and each spring is engaged, at its two ends, with studs 31, 31 projecting from the edge faces of the two adjacent friction blocks.

For forcing the blocks outwardly into engagement with the braking face 14 of the conical outer brake member 13, a fluid distensible annular rubber bag 32 is mounted in the bottom of the channel defined by the flanges 26, 27 of the member 16 and is provided with a fluid-conducting stem 33 for connection with pressure-fluid supplying means (not shown) and permissibly with alternative means (not shown) for applying suction to the interior of the bag.

The rubber bag preferably is mold-vulcanized in such form as to have substantially no fluid capacity when in an unstrained condition and the parts preferably are so proportioned that when the brake is applied there will be only a very small amount of fluid in the bag, so that the application and the full release of the brake will be quick and so that there is so small an amount of fluid present that its expansion by heat will not cause the brake to bind or excessively increase the braking pressure.

The adjustment feature makes it possible to maintain or re-establish this condition by quick and easy adjustment as the blocks or shoes become worn.

Preferably the bag is of such radial thickness that when it is collapsed there will be a substantial ventilating space 34 between it and the blocks, the blocks resting upon the flanges 26, 27, under the force of the springs 29, and the flanges preferably are formed with ventilating marginal recesses or notches, such as the notches 35, 35, Fig. 2.

For excluding dirt and water an annular stamping 36 may be press-fitted on the member 16 as shown clearly in Fig. 1.

The conical arrangement of the parts contributes largely to the attainment of the above-stated objects and especially to the effective ventilating and cooling of the parts, a centrifugal fan effect being provided by the conical form of the parts, and the conical form also provides for easy and very accurate adjustment, as for compensating for wear, by the simple operation of setting up the adjustment nut 24.

In case the bag-stem 33 is connected for the use of suction for collapsing the bag, the springs 29 can be omitted, the friction blocks in that case being secured to the bag and the flanges 26, 27 preferably being sufficiently low to permit substantially complete collapse of the bag.

In the modification illustrated in Fig. 3, a series of bellows-like metal members such as the member 37, one for each friction block, are substituted for the annular distensible bag 32 of Fig. 1, each bellows-like member having an inner end-closure plate 38 seated against the floor of the channel in the member 16 and provided with a fluid conducting stem 33ª, and the member bearing provided with an outer end-closure plate 39 bearing against, or secured to, the friction block 15. Preferably a cup-shaped filler member 40 is mounted within the bellows, as shown, to reduce the effective fluid capacity of the assembly.

In both of these embodiments, although the outer frictional-engagement surface is of conical form, the pressure-multiplication of the conebrake principle is not employed, as the shoes or blocks 15 are moved from and toward the frictional-engagement face 14 in a direction normal to it, and while danger of grabbing or sticking of the brake is thus avoided, the fluid-actuated feature provides for ample frictional-engagement pressure.

I claim:

1. The combination of two relatively rotatable structures, one of the same having a conical frictional-engagement surface and the other comprising a multiplicity of frictional engagement members and a directly-acting, fluid-distensible, flexible member composed at least primarily of a material having substantially the resilient deformability of vulcanized soft rubber for moving them toward and from the said surface, for frictional engagement and disengagement, in a direction substantially normal thereto.

2. The combination of two relatively rotatable structures, one of the same having an internal conical frictional-engagement surface and the other comprising a multiplicity of frictional engagement members and a fluid-distensible, flexible member composed at least primarily of a material having substantially the resilient deformability of vulcanized soft rubber for moving them toward and from the said surface, for frictional engagement and disengagement, in a direction substantially normal thereto.

3. The combination of two relatively rotatable structures, one of the same having a conical frictional-engagement surface and the other comprising a plurality of frictional engagement members, a directly-acting, fluid-distensible, flexible member for moving them toward and from the said surface, for frictional engagement and disengagement, in a direction transverse to the axis of rotation, and means for holding one of said structures in different positions of adjustment, lengthwise of the axis of rotation, with relation to the other.

4. The combination of two relatively rotatable structures, one of the same having a conical frictional-engagement surface and the other comprising a plurality of frictional engagement members and means for moving them toward and from the said surface, for frictional engagement and disengagement, in a direction substantially normal thereto, the combination including a fluid-distensible member for forcing the said members into engagement with said surface, and means for holding one of said structures in different positions of adjustment with relation to the other.

5. The combination of two relatively rotatable structures adapted for frictional engagement with each other, one of said structures comprising in circumferential series a multiplicity of frictional-engagement members, a mounting therefor, the said members being radially slidable in but interlocked against rotation with relation to said mounting, and a fluid distensible, flexible member composed at least primarily of a material having substantially the resilient deformability of vulcanized soft rubber for effecting their frictional engagement with the other structure, the frictional-engagement surfaces of said members being conically arranged.

6. The combination of two relatively rotatable structures, one of the same having a conical frictional-engagement surface and the other comprising a plurality of frictional engagement members, means for moving them toward and from the said surface, for frictional engagement and disengagement, in a direction substantially normal thereto, and means for holding one of said structures in different positions of adjustment with relation to the other, the last said means comprising yielding means urging one of the structures in a direction away from the other and screw-threaded means for forcing it in the opposite direction against the force of the yielding means.

7. The combination of two relatively rotatable structures adapted for frictional engagement with each other, one of said structures comprising in circumferential series a multiplicity of frictional-engagement members and a fluid distensible, flexible member composed at least primarily of a material having substantially the resilient deformability of vulcanized soft rubber for effecting their frictional engagement with the other structure by movement in a direction oblique to the axis of rotation.

8. The combination of two relatively rotatable structures adapted for frictional engagement with each other, one of said structures comprising in circumferential series a multiplicity of frictional-engagement members having conically arranged frictional-engagement surfaces and a fluid-distensible bag composed at least primarily of a material having substantially the resilient deformability of vulcanized soft rubber for effecting their frictional engagement with the other structure by movement in a direction transverse to the axis of rotation.

9. The combination of two relatively rotatable structures adapted for frictional engagement with each other, one of said structures comprising a circumferential series of frictional-engagement members having conically arranged frictional-engagement surfaces with the apex angle of the cone, each way from the axis, not greater than sixty degrees and fluid-distensible metallic fluid-containers of bellows form for effecting their frictional engagement with the other structure by movement in a direction transverse to the axis of rotation.

10. The combination of two relatively rotatable structures adapted for frictional engagement with each other, one of said structures comprising a circumferential series of frictional-engagement members and fluid-distensible means for effecting their frictional engagement with the other structure by movement in a direction oblique to the axis of rotation, the said fluid-distensible means comprising a metallic fluid-container of bellows form, and filler means therein for lessening its fluid capacity.

11. The combination of two relatively rotatable structures adapted for frictional engagement with each other, one of said structures comprising a circumferential series of frictional-engagement members, a mounting therefor, the said members being radially slidable in but interlocked against rotation with relation to said mounting, and a fluid distensible bag for effecting their frictional engagement with the other structure, the said members and the bag being conically arranged, and the parts being so proportioned and arranged as to provide ventilating space between the said members and the bag when the bag is relieved of internal actuating pressure.

12. The combination of two relatively rotatable structures adapted for frictional engagement with each other, one of said structures comprising a circumferential series of frictional-engagement members, a mounting therefor, the said members being radially slidable in but interlocked against rotation with relation to said mounting, and a fluid distensible bag for effecting their frictional engagement with the other structure, the parts being so proportioned and arranged as to provide ventilating space between the said members and the bag when the bag is relieved of internal actuating pressure, the said space being conical.

13. The combination of two relatively rotatable structures adapted for frictional engagement with each other, one of said structures comprising a circumferential series of frictional-engagement members, a mounting therefor, the said members being radially slidable in but interlocked against rotation with relation to said mounting, and a fluid distensible bag for effecting their frictional engagement with the other structure, the parts being so proportioned and arranged as to provide ventilating space between the said members and the bag when the bag is relieved of internal actuating pressure, and the mounting for the bag being formed with ventilating passages in communication with said space.

14. The combination of two relatively rotatable structures adapted for frictional engagement with each other, one of said structures comprising a circumferential series of frictional-engagement members, a mounting therefor, the said members being radially slidable in but interlocked against rotation with relation to said mounting, and a fluid distensible bag for effecting their frictional engagement with the other structure, the said members and the bag being conically arranged, the parts being so proportioned and arranged as to provide ventilating space between the said members and the bag when the bag is relieved of internal actuating pressure, and the mounting for the bag being formed with ventilating passages in communication with said space.

15. The combination of two relatively rotatable structures adapted for frictional engagement with each other, one of the same comprising, for effecting such engagement, a fluid-distensible annular bag composed at least primarily of a material having substantially the resilient deformability of vulcanized soft rubber, which bag when undistended is of oblong cross-sectional form with its longer cross-sectional axes disposed substantially as elements of a cone.

16. The combination of two relatively rotatable structures adapted for frictional engagement with each other, one of the same comprising, for effecting such engagement, a fluid-distensible bag composed at least primarily of a material having substantially the resilient deformability of vulcanized soft rubber, which bag is so shaped and so mounted as to distend in a direction oblique to the axis of rotation.

17. The combination of two relatively rotatable structures, one of the same having a conical frictional-engagement surface and the other comprising a multiplicity of frictional engagement members having conically arranged frictional-engagement surfaces, and a directly acting, fluid-distensible flexible member composed at least primarily of a material having substantially the resilient deformability of vulcanized soft rubber for moving them toward and from the said surface, for frictional engagement and disengagement, in directions transverse to the axis of rotation.

18. The combination of two relatively rotatable structures adapted for frictional engagement with each other, one of the same having a conical frictional engagement surface and the other comprising in circumferential series a multiplicity of frictional-engagement members having conically arranged friction surfaces, a mounting for said members, the said members being radially slidable in but interlocked against rotation with relation to said mounting, and a fluid-distensible, flexible member composed at least primarily of a material having substantially the resilient deformability of vulcanized soft rubber for effecting their frictional engagement with the other structure.

THOMAS L. FAWICK.